United States Patent [19]
Tobias

[11] Patent Number: 5,729,938
[45] Date of Patent: Mar. 24, 1998

[54] WALL PENETRATOR SLEEVE SYSTEM

[76] Inventor: Michael A. Tobias, 421 Second Ave., Saraland, Ala. 36571

[21] Appl. No.: 679,346

[22] Filed: Jul. 11, 1996

[51] Int. Cl.⁶ ..................................................... F04B 5/48
[52] U.S. Cl. .................. 52/220.8; 52/232; 52/223.13; 52/698; 52/742.1; 248/56; 285/192
[58] Field of Search ........................... 52/220.1, 220.8, 52/236.7, 223.13, 698, 1, 232, 742.1; 285/192, 195, 207, 217, 218; 248/56

[56] References Cited

U.S. PATENT DOCUMENTS

| | | |
|---|---|---|
| 2,542,583 | 2/1951 | Shea, Jr. . |
| 3,125,358 | 3/1964 | Kleinberg et al. ............... 285/192 X |
| 3,377,807 | 4/1968 | Nave ................................ 52/698 X |
| 4,302,917 | 12/1981 | Fernvik et al. . |
| 4,739,596 | 4/1988 | Cunningham et al. ........... 248/56 X |
| 4,788,800 | 12/1988 | Whiteley . |
| 5,123,315 | 6/1992 | Asbery . |
| 5,174,077 | 12/1992 | Murota .......................... 52/220.8 X |
| 5,351,448 | 10/1994 | Gohlke et al. . |
| 5,447,400 | 9/1995 | Seymour . |
| 5,456,050 | 10/1995 | Ward . |
| 5,482,329 | 1/1996 | McCall et al. .................. 285/206 X |
| 5,483,990 | 1/1996 | Martin . |
| 5,548,934 | 8/1996 | Israelson ........................... 52/220.8 |
| 5,560,174 | 10/1996 | Goto ............................... 52/726.1 X |
| 5,594,202 | 1/1997 | Tobias ............................ 240/56 X |

*Primary Examiner*—Carl D. Friedman
*Assistant Examiner*—Winnie S. Yip
*Attorney, Agent, or Firm*—Nies, Kurz, Bergert & Tamburro

[57] ABSTRACT

A wall penetrator sleeve system and method for using same provides an encasement for wires and cables passing through a wall or floor. The sleeve system is particularly useful in penetrating firewalls without violating the applicable fire codes. In one embodiment of the invention, the system includes an elongated conduit having a toothed end capable of penetrating the desired surface. The system also includes appropriate securing devices for tightly retaining the conduit in place. In another embodiment, the securing devices include at least one flat washer and a sliding washer lock on each side of the wall.

16 Claims, 3 Drawing Sheets

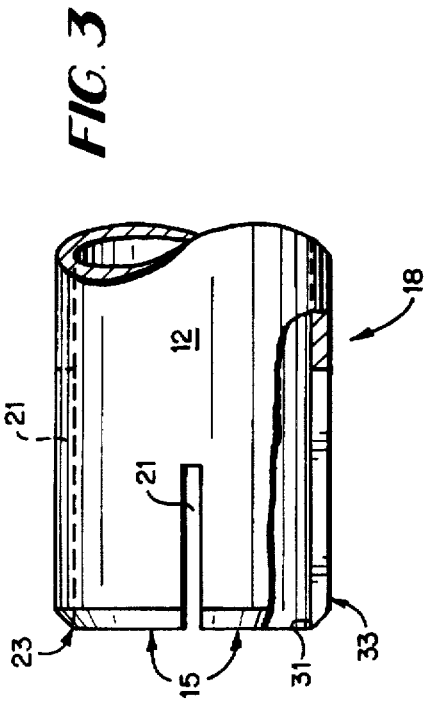
*FIG. 3*
*FIG. 2*
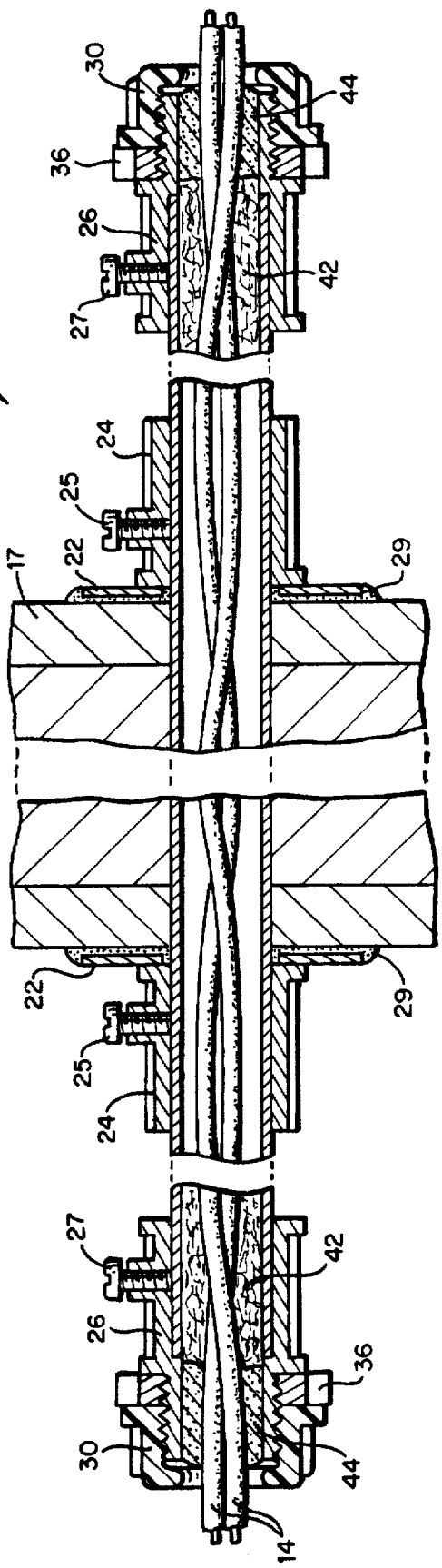
*FIG. 4*

WALL PENETRATOR SLEEVE SYSTEM

BACKGROUND AND SUMMARY OF THE INVENTION

This invention is related to cabling systems, and more particularly to a sleeve system for cables and wires extending through a wall or floor wherein the sleeve system penetrates the wall or floor and provides a conduit for cables and wires which meets the applicable fire code.

Firewalls in the building construction industry are designed to delay the spread of smoke and flame within the building in the event of a fire. When improperly shielded holes are created in firewalls to allow cables or wires to extend through the wall, they greatly reduce the effectiveness of the firewall. Additionally, improperly shielded holes in firewalls will often fail national, state, or local building codes which can result in a total system shutdown until the firewall is properly resealed by removing the cables, installing the necessary sleeves and repulling the system cables.

There is therefore a need for a device which can create a conduit through a firewall for the passage of wires and cables which meets the applicable fire codes for firewall penetrations.

Prior art devices related to wall penetrating devices include, for example, the following U.S. Pat. Nos.: 2,542,583 to Shea, Jr.; 4,302,917 to Fermvik et al.; 4,788,800 to Whiteley; 5,123,315 to Asbery; 5,351,448 to Gohlke et al.; 5,447,400 to Seymour; 5,456,050 to Ward; and 5,483,990 to Martin.

The present invention provides a device and method for penetrating a firewall with no external tools so as to provide a conduit for wires and cables which is in conformance with the applicable fire code.

It is thus one object of the present invention to provide a device which can properly penetrate a firewall according to current National Fire and Electric Code standards.

It is yet another object of the present invention to provide an easy-to-install device for protecting cables or wires through a wall or floor.

It is another object of the present invention to provide a method for penetrating a firewall which provides a conduit for passing wires and cables that meets applicable fire codes.

By the present invention, there is provided a wall penetrator sleeve system for sealing cables or wires in a firewall environment. In one embodiment, the system includes an elongated cylindrical sleeve having a slotted end capable of penetrating a firewall. The sleeve contains the cables or wires and is secured within the wall by the use of at least one flat washer and a sliding washer lock on each side of the wall. A threaded coupler and bushing are then positioned over the sharp outer ends of the sleeve.

BRIEF DESCRIPTION OF THE DRAWINGS

FIGS. 2 and 3 are front and side elevations, respectively, of the slotted end of the sleeve system of FIG. 1.

FIG. 4 is a side cross-sectional view of the sleeve system of FIG. 1 shown installed through a firewall.

DESCRIPTION OF THE PREFERRED EMBODIMENTS

Figure 1:
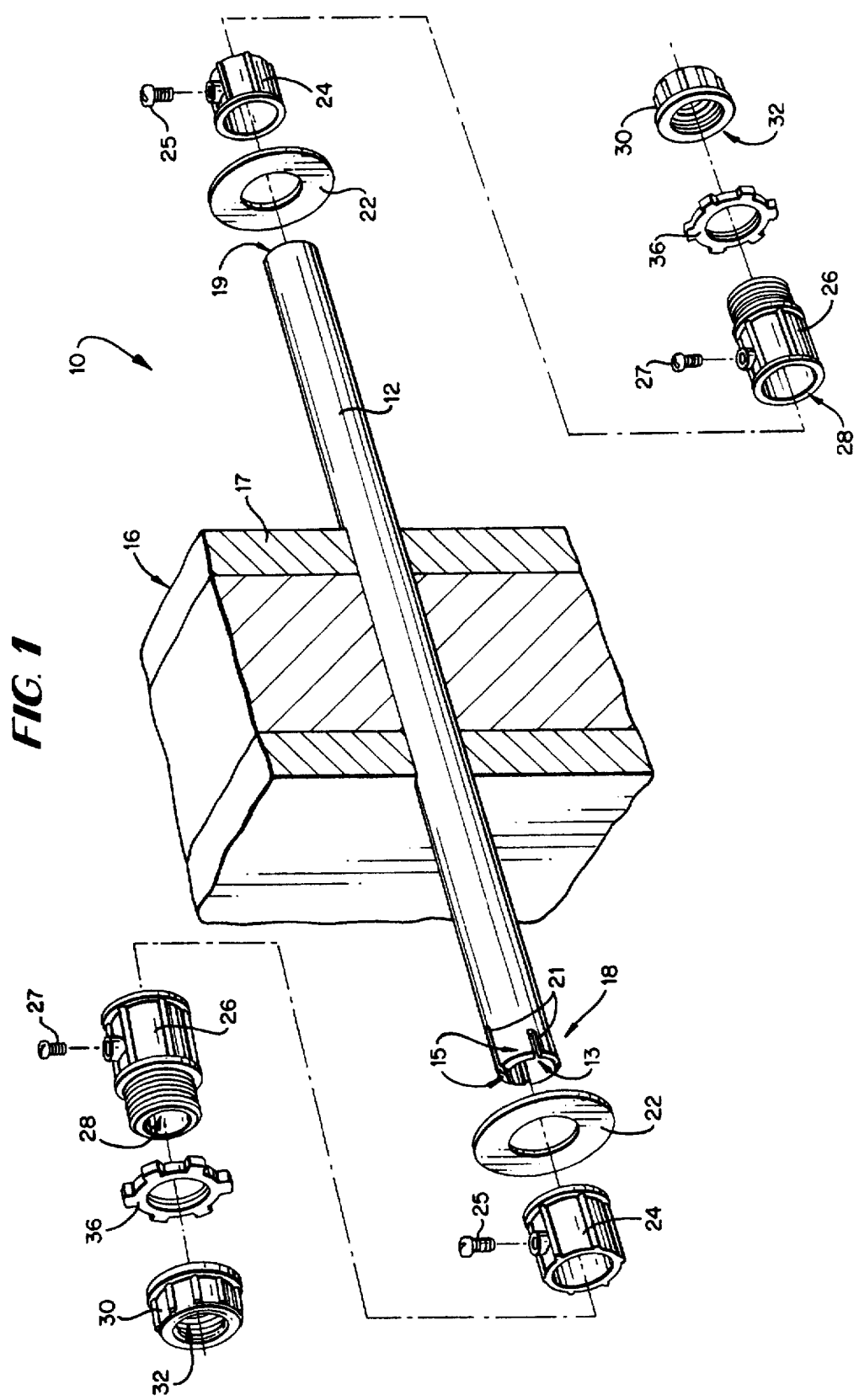
FIG. 1 is an exploded perspective view of one embodiment of the device of the present invention showing the sleeve member in position within the firewall.

As shown in FIGS. 1 through 6, there is provided a firewall penetrator sleeve system 10 for use such as in providing building structure cable penetrations which meet applicable fire code requirements. While the drawing figures depict the use of the sleeve system 10 horizontally through a firewall 16, the sleeve system 10 may also be employed in a vertical arrangement such as in a ceiling or floor penetration. The system 10 includes an elongated cylindrical sleeve 12 having a hollow interior 13 wherein the sleeve 12 may be a section of EMT (Electrical Metallic Tubing) conduit. The sleeve 12 acts as the outer casing for the wires or cables 14 which are to run through the firewall 16, for example. The firewall 16 typically includes wood or metal frame studs covered on both sides with dry wall material in the form of a sheet 17 of fire rated sheet rock. Alternatively, the firewall may be constructed of cinderblock. Common cinderblock firewalls are typically rated as two-hour firewalls, meaning the wall will hold up for two hours in a fire. Common sheetrock walls are typically rated as one-hour firewalls.

As shown in FIGS. 1 through 3, one outer end surface 18 of the sleeve 12 may have one or more slots 21 extending partially along the length of the sleeve to form teeth 15 which are capable of cutting and penetrating dry wall. In one embodiment of the device, as shown in FIGS. 2 and 3, four slots 21 are cut into the outer end surface 18 such as by a bandsaw or the like and are spaced equidistantly about the circumference of the sleeve end 18. The slots 21 between the teeth may vary in length as shown in FIG. 3 to provide the teeth 15 with varying flexibility such that the sleeve device can penetrate different surfaces with equal efficiency. In one embodiment of the device, the slots 21 are ¹⁄₁₆ inch in width and alternate in depth between ¾ inches and 1½ inches. Thus, referring to FIG. 2, the slots 21 at the twelve and six o'clock position may be 1½ inches in depth and the slots 21 at the three and nine o'clock positions may be ¾ inches in depth, for example.

As shown in FIG. 3, the thickness of the edge 23 of the cutting teeth 15 may also be reduced such as by grinding down the leading edge 23 at an angle, such as 45 degrees, for example. This provides an even sharper edge for cutting the dry wall. The edge may be angled so as to leave the radially inner edge 31 of the sleeve end 18 as the leading or cutting edge, as shown in FIGS. 2 and 3, or vice versa, such that the radially outer edge 33 is the leading or cutting edge. Alternatively, the radially outer 33 and inner 31 edges may both be cut back such that the cutting edge of the teeth is in between the radially inner and outer edges of the sleeve end 18.

The sleeve 12 may vary in length depending upon the desired application. The sleeve 12 should also be wide enough to accommodate any desired size of cable or wiring. In one embodiment of the invention, the sleeve inside diameter can range from ½ inch to 4 inches.

Round washers 22 and sliding washer locks 24 with set screws 25 are positionable around the outer surface of the sleeve 12. The washers 22 and washer locks 24 may be made of metal, for example, and help to maintain the installed sleeve 12 in close fitting engagement within the firewall 16, as shown in FIG. 4. As shown in FIGS. 1 and 4, a pair of partially threaded couplers 26, each having a central opening or aperture 28, are positioned around the outer surface of each end 18, 19 of the sleeve 12 to take the sharp edge off the ends of the sleeve. The couplers 26 may also be made of metal and are maintained on the sleeve 12 by a set screw 27 or the like. A pair of threaded metallic washers 36 and a pair of threaded plastic bushings 30 are also provided, as shown in FIGS. 1 and 4, to cover the ends of the couplers 26 and thereby provide a smoother and safer surface about which to work.

In operation, with reference to FIGS. 1 and 4, the size of the hole needed in the firewall 16 is first determined. The sleeve corresponding to the desired size is then placed with its toothed end 18 against the wall. The sleeve end 19 away from the wall is then hit with a light force such as that provided by the palm of the hand so as to set the sleeve's cutting teeth 15 into the wall. The sleeve may then be rotated by hand to act like a drill in penetrating the wall.

Once the sleeve penetrates both sides of the wall, a round washer 22 is placed over each end of the sleeve and positioned against the wall using fire dam caulk 29 or the like as shown in FIG. 4. The fire dam caulk 29 provides a tight permanent seal to hold the washer 22 in place. A sliding washer lock 24 with a set screw 25 is then placed over each end 18, 19 of the sleeve and positioned against its respective round washer 22. Tightening the set screw 25 on the sliding washer lock 24 against the sleeve 12 ensures a close fitting engagement of the sleeve 12 within the firewall 16. The threaded couplers 26 are then placed over each end of the sleeve 12 and secured by tightening the set screw 27 against the sleeve 12. A respective threaded washer 36 and threaded plastic bushing 30 are then secured to the end of each threaded coupler 26. Cables or wires 14 may then be pulled through the sleeve 12. Once the cables 14 are passed through the sleeve, the ends 18, 19 of the sleeve system 10 may be sealed with appropriate insulation 42 and fire dam putty 44. The fire dam putty 44 remains pliable such that reentry into the conduit is possible, such as to install more cables.

Figure 5:
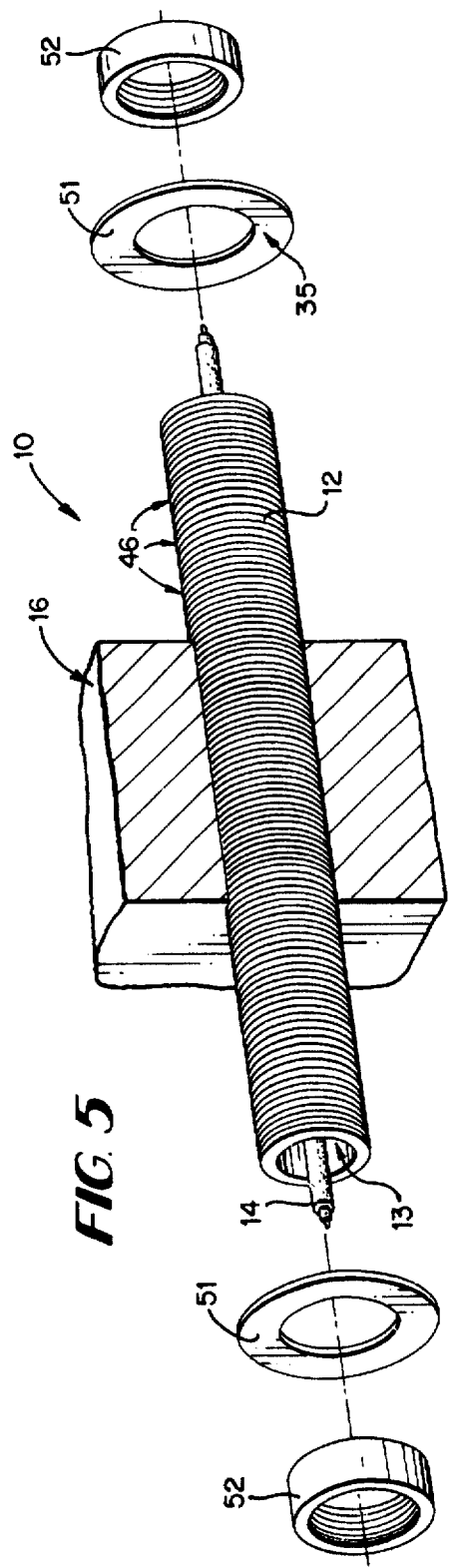
FIG. 5 is an exploded perspective view of another embodiment of the present invention showing the sleeve member in position within the firewall.
Figure 6:
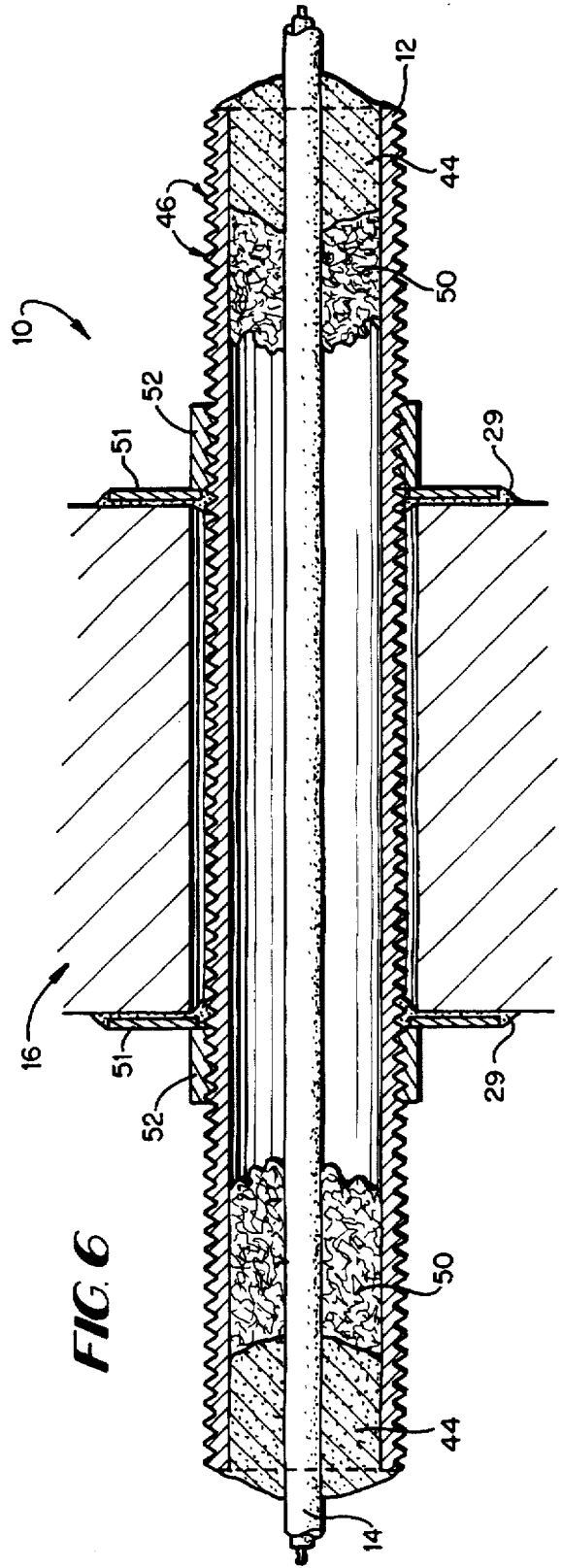
FIG. 6 is a side cross-sectional view of the sleeve system of FIG. 5 shown installed through a firewall.

In one embodiment of the invention, as shown in FIGS. 5 and 6, the sleeve 12 is externally threaded as at 46 along its entire length and has no sharp edge at either end. This embodiment is particularly suited for two-hour, or cinderblock, firewalls which are not easily penetrated. In this embodiment, the appropriate sized hole is pre-drilled through the wall, then the sleeve 12 is positioned within the wall so as to have equal protrusion on either side of the wall. The diameter of the hole to be predrilled is larger than the sleeve inside diameter. In one embodiment, the pre-drilled hole is ⅛ inch to ½ inch larger in diameter than the sleeve. For example, a 2 inch sleeve requires a 2⅜ inch hole and a 4 inch sleeve requires a 4½ inch hole.

Washers 51 and threaded couplers 52 are then positioned around both ends of the sleeve 12. The washers 51 and threaded couplers 52 may be made of metal, for example. Fire dam caulking 29 is then applied to the inner surface 35 of each washer 51 so as to provide a seal for the washers 51 as they are positioned against the wall. The couplers 52 are then screwed along the sleeve 12 until they firmly abut the washers 51 so as to maintain the sleeve 12 securely within the wall and compress the washers 51, thereby sealing the sleeve system to the wall. After the wiring or cabling 14 is pulled through the sleeve conduit, appropriate insulation 50, such as wool batt insulation, and pliable fire dam putty 44 are then inserted into each end of the sleeve interior 13 to complete the sealing of the sleeve system.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A sleeve system for encasing wiring or cabling passing through a wall or floor, comprising:
    a hollow cylindrical sleeve having two outer ends and an interior, said ends defining respective openings which allow passage of said wiring or cabling through said sleeve, one of said outer ends having a sharpened leading edge around the circumference thereof so as to form a cutting surface for penetrating said wall or floor;
    securing means for securing said sleeve within said wall or floor, whereby said wiring or cabling can pass through said securing means and said hollow sleeve; and
    end capping means for covering said sleeve outer ends, including said sharpened leading edge, to thereby provide a smooth edge to each of said sleeve outer ends.

2. The sleeve system of claim 1 wherein said securing means includes at least one round washer and at least one sliding washer with a set screw.

3. The sleeve system of claim 1 wherein said end capping means includes a coupler with a locking set screw and a bushing threadedly connected to said coupler.

4. The system of claim 1 wherein said end having said cutting surface has at least one slot extending partially along the length of said sleeve.

5. The system of claim 4 wherein said cutting surface has a plurality of slots extending partially along the length of said sleeve, said slots being spaced equidistantly around the circumference of said sleeve end.

6. The system of claim 5 wherein said plurality of slots alternate in depth.

7. The system of claim 1 wherein said sleeve end having said cutting surface has a radially inner and a radially outer edge and said sharpened leading edge is the sleeve radially inner edge.

8. The system of claim 1 further including sealing means for sealing the interior of said hollow sleeve.

9. A method for encasing wiring or cabling to be passed through a wall, comprising the steps of:
    (a) providing a hollow cylindrical sleeve having two outer ends and an interior, said ends defining respective openings which allow passage of said wiring or cabling through said sleeve;
    (b) providing one of said outer ends with a sharpened leading edge around the circumference thereof so as to form a cutting surface;
    (c) positioning said cutting surface against a wall to be penetrated;
    (d) applying pressure to said sleeve end opposite said sleeve cutting surface end so as to allow said cutting surface to penetrate said wall;
    (e) rotating said sleeve so as to allow further sleeve penetration of said wall;
    (f) securing said sleeve within said wall;
    (g) providing end capping means on each end of said sleeve so as to cover said sleeve outer ends, including said sharpened leading edge, and thereby provide a smooth edge to each of said sleeve outer ends; and
    (h) pulling the cabling or wiring through said hollow sleeve.

10. The method of claim 9 wherein said cutting surface end is provided with at least one slot extending along the length of said sleeve.

11. The method of claim 10 wherein said cutting surface end is provided with a plurality of slots extending partially along the length of said sleeve, said slots being spaced equidistantly around said cutting surface end.

12. The method of claim 11 wherein said plurality of slots alternate in depth.

13. The method of claim 12 further including the step of providing said sleeve cutting surface end with a radially outer and a radially inner edge and wherein said sharpened leading edge is the radially inner edge.

14. The method of claim 9 wherein the step of securing said sleeve within said wall includes providing a washer and a sliding washer lock around said sleeve on both sides of said wall.

15. The method of claim 9 including the further step of sealing the interior of said hollow sleeve after the cabling or wiring has been pulled.

16. The method of claim 15 wherein the step of sealing the sleeve interior includes inserting fire resistant insulating material and fire resistant putty material into both ends of said hollow sleeve.

* * * * *